(12) United States Patent
Ahlgren et al.

(10) Patent No.: US 6,212,020 B1
(45) Date of Patent: Apr. 3, 2001

(54) HEAD-MOUNTED CARRIER FOR POSITIONING OPTO-ELECTRONIC DEVICES IN FRONT OF THE USER'S EYES

(75) Inventors: Urban Ahlgren, Stockholm; Mikael Edoff, Nacka; Jonas Ericsson, Hagersten; Stefan Magnusson, Stockholm; Sam Peters, Stockholm; Therese Swartling, Stockholm; Petter Astradsson, Stockholm, all of (SE)

(73) Assignee: ECT Eye Control Technique AB, Bollnas (SE)

( * ) Notice: Subject to any disclaimer, the term of this patent is extended or adjusted under 35 U.S.C. 154(b) by 0 days.

(21) Appl. No.: 09/446,644

(22) PCT Filed: Jun. 25, 1998

(86) PCT No.: PCT/SE98/01234

§ 371 Date: May 12, 2000

§ 102(e) Date: May 12, 2000

(87) PCT Pub. No.: WO98/59273

PCT Pub. Date: Dec. 30, 1998

(30) Foreign Application Priority Data

Jun. 25, 1997 (SE) .................................................. 9702446-7
Oct. 23, 1997 (SE) .................................................. 9703854-1

(51) Int. Cl.[7] .............................. G02B 7/02; G02B 27/14; G09G 5/00; G02C 3/00
(52) U.S. Cl. .............................. 359/815; 359/630; 345/8; 351/156
(58) Field of Search .................................. 359/815, 630, 359/631, 632, 633, 634, 636, 637, 638, 639; 345/7, 8; 351/156; 2/6.3, 410, 452

(56) References Cited

U.S. PATENT DOCUMENTS

| 5,003,300 | * | 3/1991 | Wells ........................................ 345/8 |
| 5,539,578 | | 7/1996 | Togino et al. ....................... 359/630 |
| 5,546,227 | | 8/1996 | Yasugaki et al. .................... 359/630 |
| 5,583,795 | | 12/1996 | Smyth ........................... 364/516.444 |
| 5,589,946 | * | 12/1996 | Kobayasi ................................. 345/8 |
| 5,596,433 | | 1/1997 | Konuma ............................... 359/631 |
| 5,671,037 | * | 9/1997 | Ogasawara et al. ................ 361/158 |
| 5,767,820 | | 6/1998 | Bassett et al. .......................... 345/8 |
| 5,971,538 | * | 10/1999 | Heffner ................................ 351/157 |
| 6,034,653 | * | 3/2000 | Robertson et al. ..................... 345/8 |
| 6,045,222 | * | 4/2000 | Oppedisano et al. ............... 351/121 |

FOREIGN PATENT DOCUMENTS 2187911 9/1987 (GB) .
2290400 12/1995 (GB) .
9314454 7/1993 (WO) .

* cited by examiner

Primary Examiner—Georgia Epps
Assistant Examiner—Saeed Seyrafi
(74) Attorney, Agent, or Firm—Ladas & Parry

(57) ABSTRACT

A head-mounted carrier for supporting an optical apparatus intended to be positioned in front of at least one eye of a user. The carrier being devised such that en elongate member or a cable, preferably comprising electric or optical conductors connected to components of the optical apparatus, is a part of the carrier itself. The cable is arranged to be applied around a part of the head of a user such that the carrier is clamped or strapped to the user's head.

16 Claims, 5 Drawing Sheets

HEAD-MOUNTED CARRIER FOR POSITIONING OPTO-ELECTRONIC DEVICES IN FRONT OF THE USER'S EYES

TECHNICAL FIELD

The present invention relates to a head-mounted carrier arrangement in general, and in particular to a head-mounted carrier arrangement for supporting opto-electric apparatuses intended to be placed in front of one of or both eyes of a human user.

BACKGROUND

There is, for different technical applications, a need to place an optical or an opto-electrical apparatus in front of the eyes of a user. An example of a classic application of this kind is common spectacles or goggles having lenses mounted on a frame comprising lens carrier, nose support and ear support.

More specific such applications are for example found in gaze shields with controllable optical properties, picture presentation devises for e.g. VR-technique (virtual reality), cameras and eye controlled apparatuses. A common feature for these examples are that such apparatuses are comparatively heavy, and in many cases comparatively heavy and spacious optic and/or electric conductors are also required. A common solution in prior art is to design the carrier in the shape of a helmet to be strapped on the head of a user. Drawbacks with such prior art carriers are inter alia that they are less handsome, often uncomfortable to carry spacious and thereby not really portable.

The development of new material and techniques has entailed an increased miniaturization of optic and electric components, which in its turn lead to lighter and more handy optical and opto-electric apparatuses. However, in many applications the problems with conductors to and from the apparatus remain.

Examples of prior art are found in the patent publications WO 95/11473 and U.S. Pat. No. 5,003,300 disclosing a number of head-mounted picture presentation devices mounted on support frames arranged for fixation on the head of a user.

OBJECT OF THE INVENTION

The object of the invention is to solve the general problem of providing a light, small, flexible in use and comfortable head-mounted carrier for an optical or opto-electric apparatus intended to be positioned in front of the eye of a user.

The overall problem comprises the following aspects:

to minimize the total weight and size of the carrier and possible electric/optical conductors;

to avoid that conductors limit the movability of a user;

to avoid that conductors affect the position of the optical apparatus in front of the user's eye;

to provide a carrier that fits different head shapes and head sizes;

to provide a carrier that is foldable and that is small when folded;

to position an optical/opto-electric apparatus in front of the eye of a user;

to compensate for an uneven distribution of weight with regard to an optical apparatus to be positioned in front of one of or both of the eyes of a user, with regard to an asymmetric distribution of weight when an optical apparatus is to be positioned in front of one eye only and/or with regard to a heavy and unwieldy cable with conductors to said optical apparatus.

SUMMARY

The above mentioned problem is, according to the present invention, solved by a carrier provided with an elongate and flexible ribbon, that possibly is elastic across and/or along its profile, for example in the shape of or comprising a cable. In a first embodiment of the invention, at least a part of the ribbon is provided with an elastic or resilient and possibly partly stiff arrangement. When in use, the ribbon is strapped on the head of a user by means of an inherent spring force and possibly by form fit through a pre-formed shape provided by means of the stiff arrangement. In a second embodiment the ribbon co-operates with e.g. a spectacle frame-like support frame in such a way that the cable is placed around or over the head of the user and is strapped to the support frame by means of one or more ribbon fastening devices. These embodiments are particularly suitable for use together with purely optical apparatuses or with opto-electric apparatuses having wireless signal transmission or when there is a need to independently connect signal conductors to an optical apparatus mounted on the carrier.

In an advantageous further developed embodiment of the invention, the above mentioned problem is solved by a carrier in which the a cable for electric and/or optical signal conductors are utilised as a part of the carrier itself. In a third embodiment, a part of the cable is therefore provided with a springing and possibly partly stiff arrangement that is intended to be strapped around the head of a user and thereby carries the rest of the cable and other components supported by the carrier. In a fourth embodiment, a part of the cable co-operates with a for example rim-like support frame and is strapped to the support frame by means of cable fastening devices. The cable will thereby itself take part in carrying its own weight and evenly distribute the weight over the head of the user. In order to come close to the axis of rotation of the head and thereby minimise the movement of the cable when moving the head, the cable is led away from the carrying parts of the carrier, preferably along the side and the neck of the user's head.

The inventive carrier is adaptable to different head shapes and head sizes by applying a selectable length of the supporting part of the ribbon or cable around the user's head. In one embodiment provided with a support frame, the adaptation can additionally be carried out through adjustment at joints between parts of the support frame and by adjusting angles of forehead support, nose support and ear support in relation to the support frame and the head of a user.

Varieties of the first and the third embodiment, respectively, are additionally provided with a device for support preferably against the lower part of a user's back head for the purpose of improving the fit against and clasp around the user's head. In a first variety, it can be a back head support comprising an ear support which is pre-shaped to fit over one of the user's ears and a prolongation arranged to clasp around the back head of the user below the carrying part of the ribbon or the cable. In a second variety, the back head support is arranged to as a branch of the ribbon or the cable, such that a branched part of the band or cable constitutes the back head support. This back head support is also devised to be applied to a user's back head below the main carrying part of the cable. The carrier may also be designed such that the back head support clasps around the head above the band or the cable.

The inventive carrier is conveniently foldable. In a first embodiment, the ribbon or the cable is flexibly pre-shaped such that the it in its resting condition winds up to e.g. a spiral form. In a second embodiment, a comprised support frame is foldable through joints possibly in addition to a windable cable.

An optical/opto-electric apparatus mounted on the carrier is positioned in front of the eye or eyes of user by adjusting the clasp of cable around the user's head and different support components such as forehead support, nose support and ear support.

An uneven distribution of weight is compensated, for example in embodiments where an optical arrangement is to be positioned before one eye only, by leading away the not carrying part of the cable on the side of the user's head opposite the side of the optical apparatus. In embodiments comprising a support frame, the side pieces and ear support will also contribute to this weight compensating function.

Explanations/Definitions

In the present text, the expression optical apparatus is used as the term for an apparatus comprising optical components in combination with electronic or opto-electric components. There may also be only optical components, which possibly communicate with another apparatus through optical conductors. Likewise, an opto-electric apparatus may also be devised to communicate wirelessly with another apparatus.

The invention will now be described by means of exemplifying embodiments and with reference to the enclosed drawings.

BRIEF DESCRIPTION OF THE DRAWINGS

It is shown in.

DETAILED DESCRIPTION OF EMBODIMENTS

Figure 1:
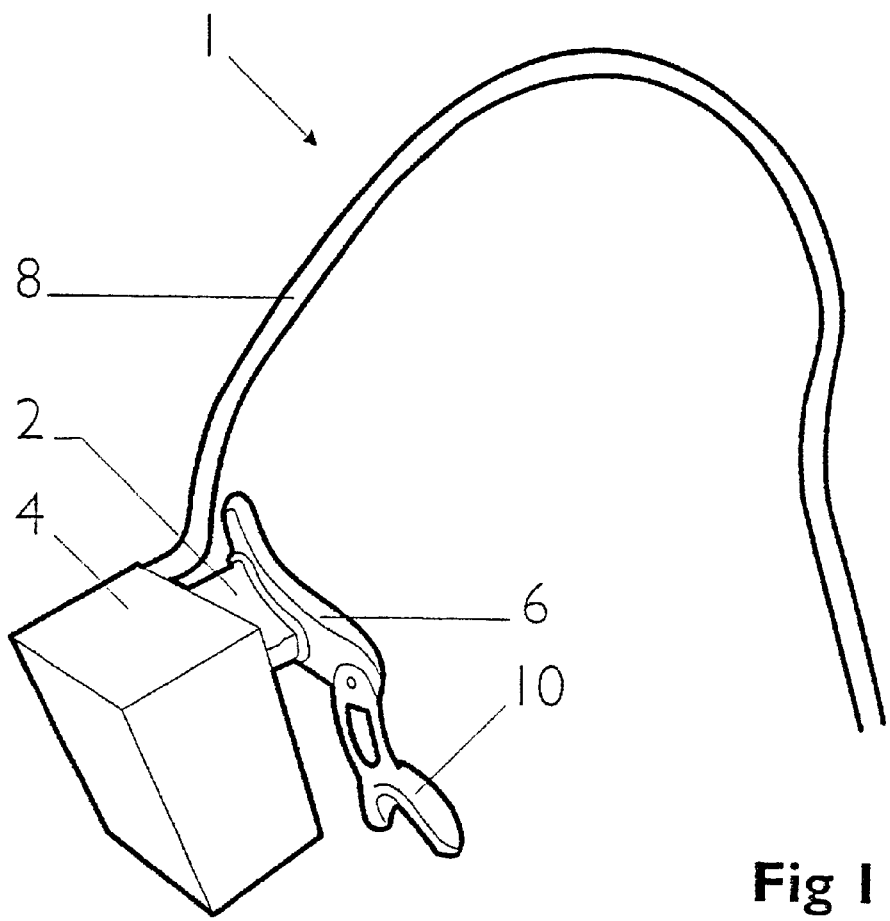
FIG. 1 a schematic view of a first embodiment of the carrier according to the invention.

FIG. 1 shows a first embodiment of a carrier 1 according to the invention. In FIG. 1, an optical apparatus or a house to an optical apparatus 4 is fastened to a holder 2, at which a forehead support 6 and nose support 10 are fastened in their turn. The optical apparatus 4 or the house to such an optical apparatus is in one embodiment an integrated part of the carrier, while another embodiment is devised such that an optical apparatus can be mounted to the carrier in a preferably detachable manner.

The carrier is preferably but not necessarily provided with a nose support for improved positioning before the eye and for support taking up weight on the nose. In an embodiment lacking the nose support, weight is supported by means of friction between the forehead support and the forehead, and by means of the supporting cable described below which clamps the carrier on the head through a spring force. In FIG. 1, the nose support is shown fastened to the holder 2 via the forehead support, but it may also be directly fastened to said holder or fastened to or integrated with the housing 4. The forehead support and the nose support are preferably fastened through joints for the purpose of being adjustable to different angles of the forehead or the nose. In one embodiment, the forehead support and/or the nose support are further adjustable perpendicularly in relation to the housing 4, e.g. by having a holder 2 being displaceable in relation to the housing.

A ribbon in the shape of or comprising a cable 8 is fastened to the holder 2 and/or to the optical apparatus 4 or the housing 4 of such an optical apparatus. The cable preferably but not necessarily comprises electric and/or optical conductors for communicating electric or optical signals and energy between the optical apparatus and another, not shown apparatus. The cable is designed as a part of the carrier and is devised to be applicable around a part of a user's head. At least a part of the cable is provided with a springing device, e.g. in the shape of a spring integrated with the cable or by means of a springing material in at least a part of the covering of the cable. The cable is further arranged or pre-shaped such that an open, substantially circular or substantially oval open loop is formed when the springing cable is stretched with a modest force. The ribbon or the cable 8 may also be provided with a stiff device that may be pre-shaped or durably pre-shapable in order to achieve form fit over the head of a user.

Figure 2:
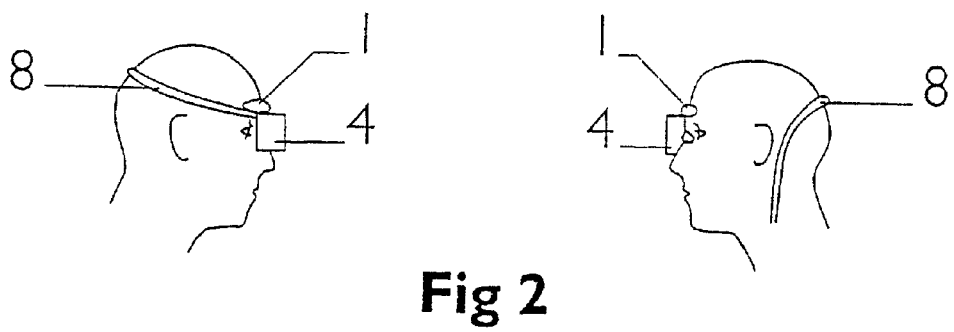
FIG. 2 two different views of the embodiment according to FIG. 1 applied on the head of a user.

FIG. 2 shows two different views of a carrier according to this embodiment applied to the head of a user. When in use, the carrier is clamped or strapped on the head by applying the forehead support 6 against the forehead and the nose support against the nose. Thereafter by bending out the springing cable, putting the cable around the head and by letting the cable strap against the head by its own spring force. The springing property of the carrying part of the cable entails that the cable follows the form of the user's head and thereby adjusts to different shape and size of the head. An optical apparatus mounted on the carrier is positioned before the eye by adjusting forehead support, nose support and the head embracing cable.

The part of the ribbon or cable that is directly involved in the carrying function is preferably not springing and is led away from the carrier. In the case that the ribbon or cable comprises signal conductors, these are preferably led away to a not shown connector, apparatus or energy source. It is clear from FIG. 2 that the rest of the cable is led away along the side of the user's head, preferably along the neck of the user. By utilising a part of a cable comprising signal conductors as a part of the carrier according to the invention, use is made of an otherwise heavy and clumsy component to carry the rest of the cable and to contribute the distribution of weight.

Figure 3:
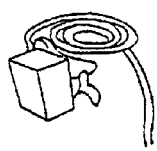
FIG. 3 a view of the embodiment according to FIG. 1 in a resting condition.

FIG. 3 shows, a carrier according to a variety of the embodiment in FIG. 1 in a resting condition, i.e. when not in use. The spring property is in this embodiment arranged such that the springing part of the ribbon or cable in unloaded condition winds up to for example a spiral. The carrier, possibly including an optical apparatus, will thus occupy a very small space when storing.

Figure 4:
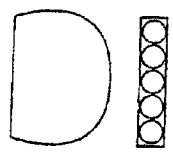
FIG. 4 different embodiments of a cable comprised in the invention.

FIG. 4 shows examples of different embodiments of a ribbon or a cable in a carrier according to the invention. In order to achieve an improved contact surface against the head of a user at least a part of the ribbon or cable may be provided with a substantially flat surface, or even be a flat cable.

Figure 5:
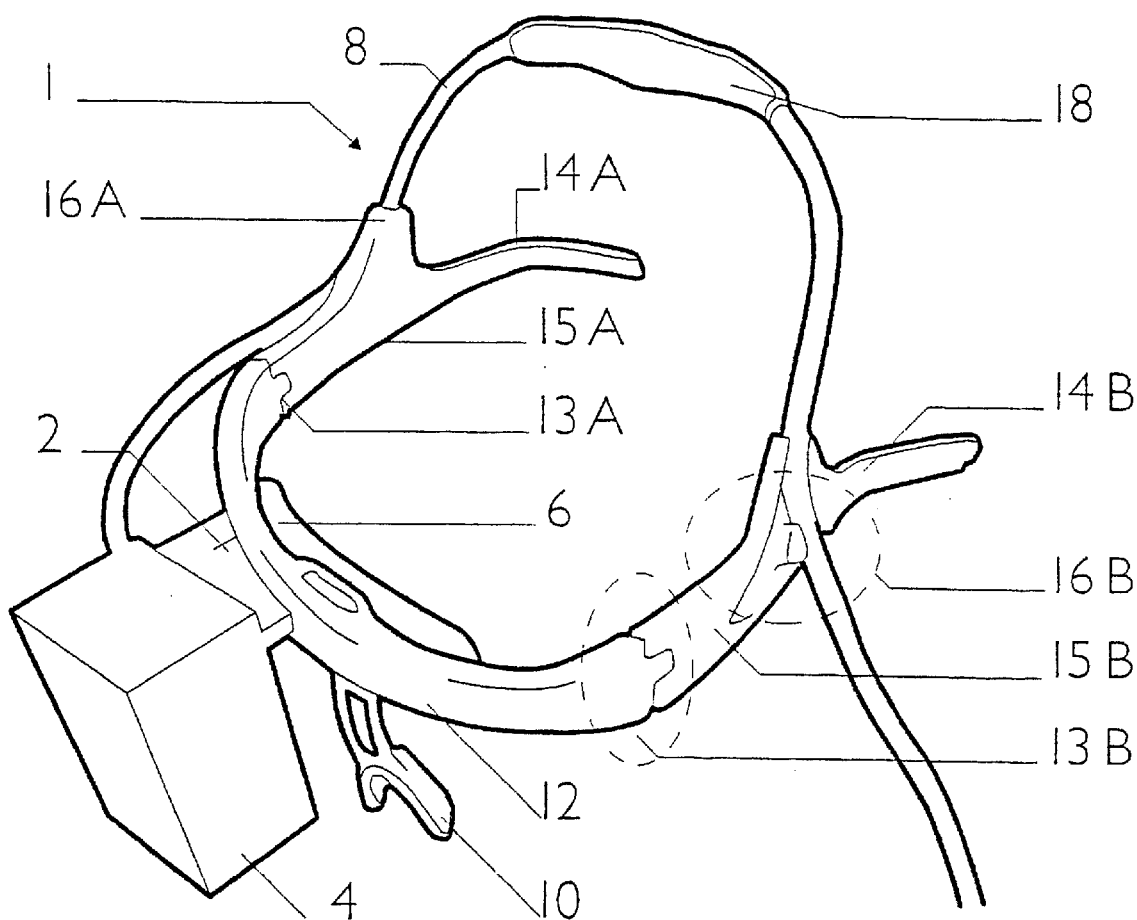
FIG. 5 a schematic view of a second embodiment of a carrier according to the invention.

FIG. 5 shows a second embodiment of a carrier according to the invention. In the same manner as in the embodiment according to FIG. 1, an optical apparatus or a housing to an optical apparatus 4 is fastened to a support piece holder 2. This embodiment of the carrier is related to traditional spectacular rims and comprises a support frame with a front piece 12 which via pivotable joints 13A,13B is connected symmetrically placed side pieces 15A, 15B. A forehead support 6 is pivotably fastened to the front piece 12 and a nose support 10 is also fastened to said front piece 12. The position of the nose support in relation to the front piece is preferably adjustable through flexibility of the selected material and/or a flexible joint between the nose support and front piece. The side pieces each comprise an ear support 14A, 14B, which preferably are adjustable in relation to the side pieces, for example by means of resilient material or constructive structure, and a cable fastening device 16A, 16B.

Similar to the preceding embodiment, this embodiment comprises a ribbon or a cable 8, possibly itself comprising electric and/or optical conductors that are connected or connectable to the optical apparatus. The ribbon or the cable 8 are fastened to the optical apparatus and/or to the holder 2, and is according to FIG. 5 therefrom led to the cable fastening device 16A of the side piece 15A being closest to the optical apparatus or housing 4. Thereafter, the cable 8 is led in an open loop from the first side piece 15A to the other, opposite side piece 15B where it is fastened to the corresponding cable fastening device 16B. The carrier is in one embodiment also provided with a head support 18 intended to distribute pressure over a larger area of a user's head. The head support can e.g. be a detachable, plate provided member that is displaceable along the cable, or an integrated part of the cable as a flat surface to be turned towards the head. The rest of the cable is thereafter led away from the carrier in the same manner as in the embodiment described in connection with FIGS. 1 and 2.

Figure 6:
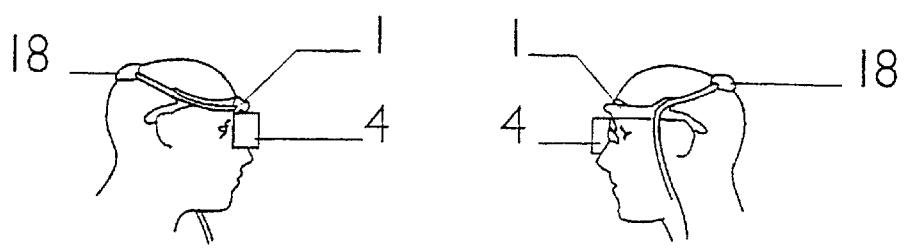
FIG. 6 two different views of the embodiment according to FIG. 5 applied on the head of a user.

FIG. 6 shows two different views of a carrier according to this second embodiment applied to a user's head. When in use, the carrier is clamped or strapped to on the user's head by applying the open loop of the ribbon or cable against the back part of the head and by adjusting the position for the fastening of the cable at the fastening devices 16A,16B of the side pieces 15A,15B (Cf. Also FIG. 5). Adjustment to different head shapes and sizes is carried out by adjusting the head embracing part of the cable at the cable fastening devices and by adjusting the povotably jointed ear supports, the pivotable forehead support and the adjustable nose support.

When storing, also this embodiment is small since it is foldable by means of the pivotable joints 13A,13B and since the cable can be wound manually or by means of preshaping or springing arrangement.

The embodiment shown in FIG. 5 is provided with an optical apparatus or a housing to an optical apparatus 4 intended to be positioned in front of a user's eye. This embodiment, however, allow for supporting two symmetrically placed optical arrangements, i.e. one for each of a user (not shown).

Figure 7:
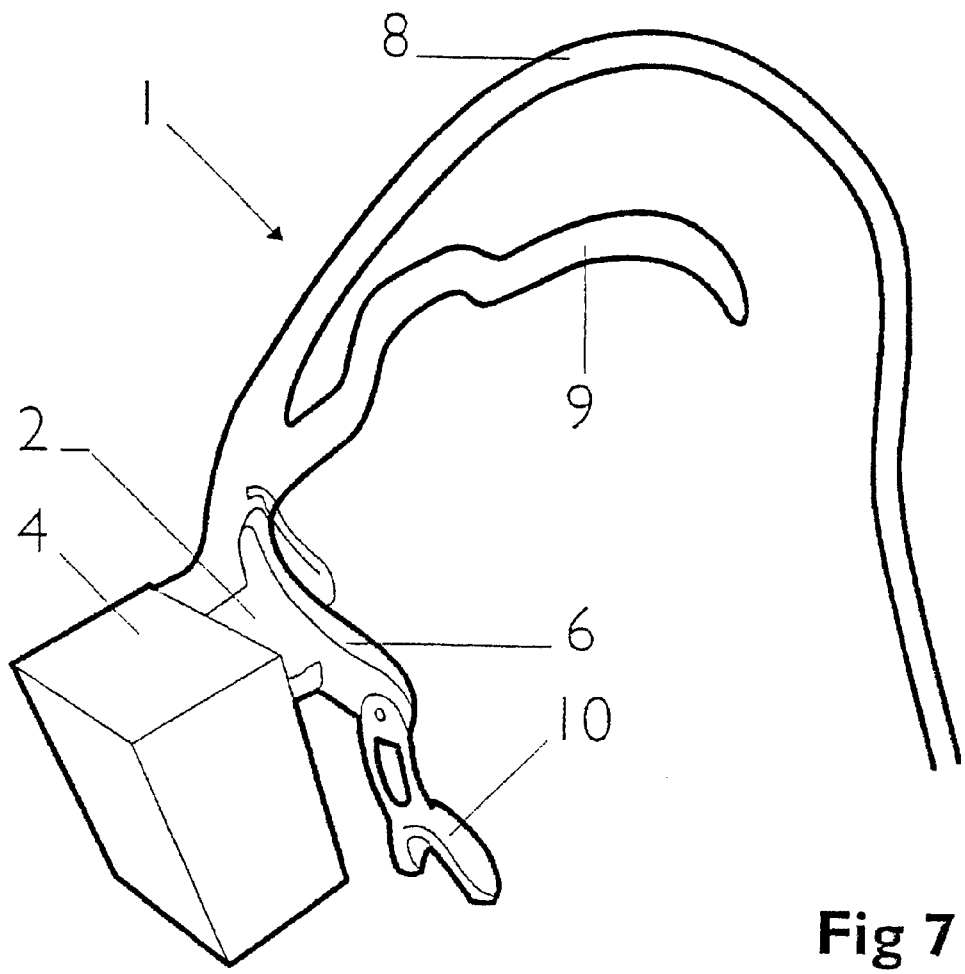
FIGS. 7–10 varieties of the embodiment according to FIG. 1.
Figure 8:
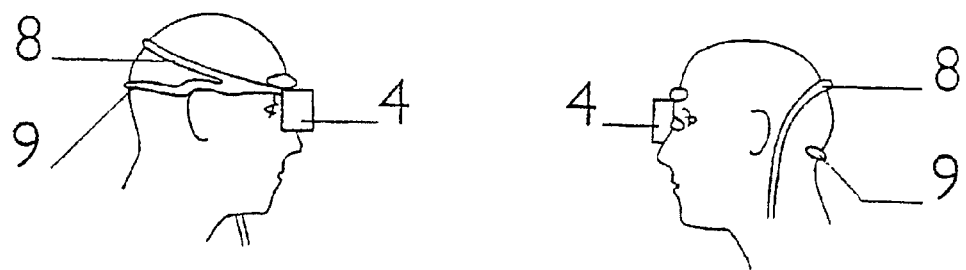

FIG. 7 shows an embodiment of the invention, which is a variety of the embodiment according to FIG. 1 and which comprises a back head support 9. The back head support is provided with a pre-shaped part for an ergonomically correct ear support. The back head support is preferably provided with a prolongation and a pre-shaped part that in use clasps around the user's head below or above the part of the cable 8 resting against the user's head. In FIG. 8, such an embodiment is shown in use applied on a user's head, whereby the back head support clasps around the head below the carrying part of the cable 8.

Figure 9:
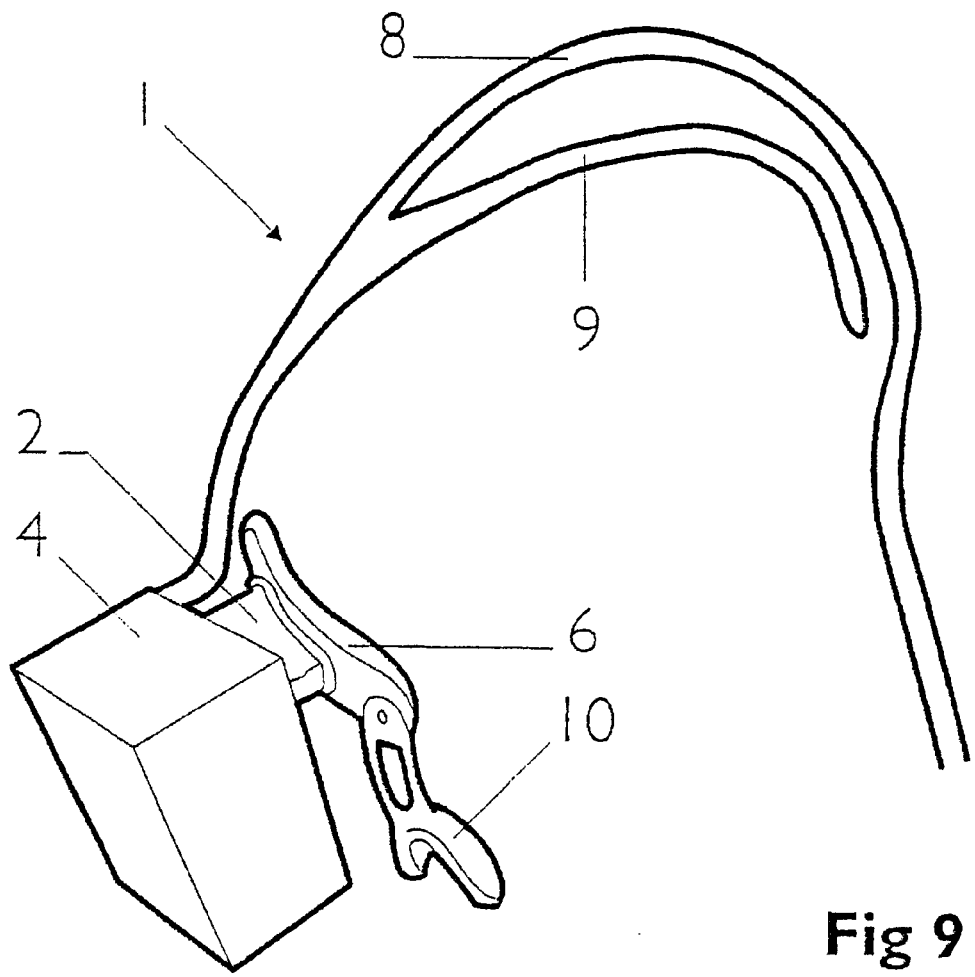
Figure 10:
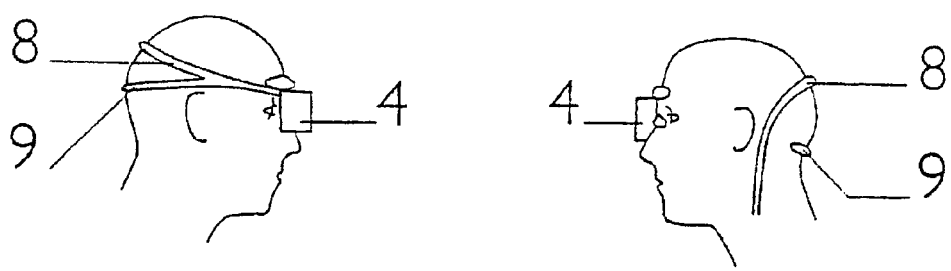

Another embodiment is shown in FIG. 9, in which the back head support 9 is designed in the shape of a ribbon or a cable similar to the carrying part of the ribbon or the cable 8 and is fastened to or branches from the cable 8. The back head support may, as in the preceding embodiment, clasp around the back head below or above the band or the cable 8. The back head support is in this embodiment arranged with springing properties such that it in use, as shown in FIG. 10, clasps around the user's back head below the carrying part of the cable 8.

Figure 11:
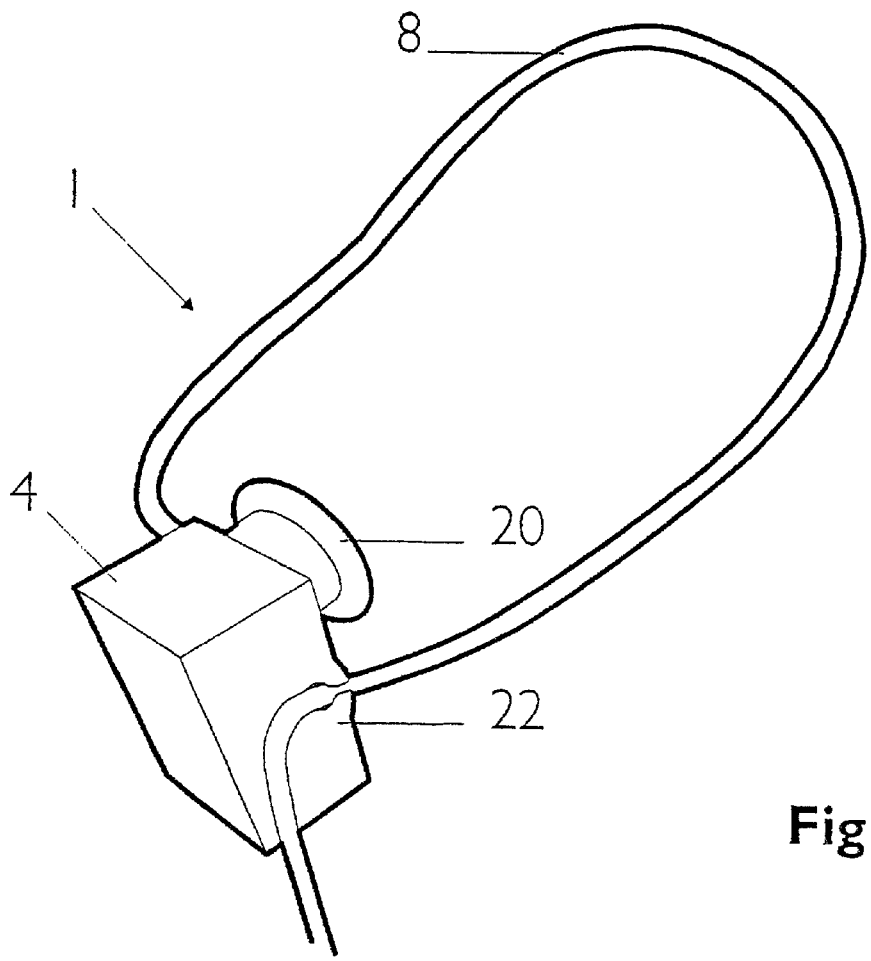
FIGS. 11–13 show another embodiment of the invention.
Figure 12:
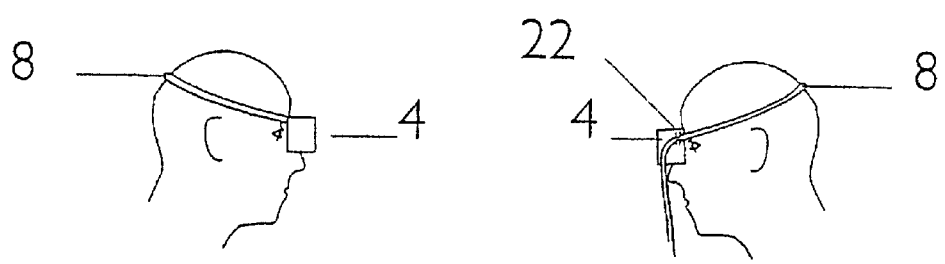
Figure 13:
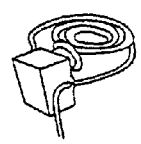

A further embodiment shown in FIGS. 11–13 of the carrier is provided with a housing 4 and an elongate member 8, e.g. a cable, fastened to the housing at one end. The housing is provided with a fastening device 22 or a socket mounted on the housing for detachably fastening a lose part of the elongate member. The elongate member being devised to form an open loop between the fastening points of the housing, and when in use the carrier is clasped or strapped to the head having contact with the head via a forehead contact surface and the elongate member. This embodiment is provided with an eye cup 20 for the front support against the head of the user.

The invention can be used in different applications, for example with a head-mounted picture presentation device comprising means for presenting a picture to the eye of a user. Another application of the invention is with a head-mounted gaze control apparatus comprising means for detecting the gaze direction or together with another optical apparatus, such as a camera or the like.

The invention has been described by means of exemplifying embodiments, but naturally it can be further modified within the inventive concept and the following claims.

What is claimed is:

1. A carrier for supporting an optical apparatus a part of which being intended to be positioned in front of at least one eye of a user, said carrier having means for attaching the carrier to the head of the user, wherein said means for attaching the carrier to the head of a user comprises an elongate member for example in the shape of a ribbon or a cable, being devised to be detachably attached over the head of the user such that the carrier is secured on the head by means of said elongate member.

2. A carrier for supporting an optical apparatus a part of which being intended to be positioned in front of the eye of a user, said carrier having means for attaching the carrier to the head of the user and a signal conductor being connectable to an optical apparatus mounted on said carrier, wherein
 an elongate member preferably in the shape of a flexible cable comprises said signal conductor and being devised to be applicable, as a part of the carrier over a part of the head of user such that the carrier is secured to the head by means of said cable.

3. A carrier for supporting an optical apparatus a part of which being intended to be positioned in front of the eye of a user, said carrier comprising:
 a holder for an optical apparatus or for a housing of an optical apparatus; and
 a cable having signal conductors being connectable to said optical apparatus, the cable being fastened to the holder and/or to the optical apparatus, and the cable being devised to be applicable, as a part of the carrier, over a part of the head of user such that carrier is secured to the head by means of said cable.

4. A carrier for supporting an optical apparatus a part of which being intended to be positioned in front of the eye of a user, said carrier comprising:

- a holder for an optical apparatus or for a housing of an optical apparatus;
- a forehead support arranged at the holder for providing a support against the forehead of a user and adjustable position of said optical apparatus in front of an eye of the a user;
- a nose support arranged at the holder for providing a weight carrying support against the nose of a user and an adjustable position of said optical apparatus in front of an eye of the a user; and
- a cable having electric and/or optical conductors being connectable to said optical apparatus, said cable being devised to be applicable, as a part of the carrier, around a part of the head of a user such that the carrier is clamped to the head and is in contact with the head through the forehead support, the nose support and a part of the cable.

5. The carrier as recited in claim 4, wherein the elongate member or cable further comprises a springing arrangement that together with the elongate member or cable forms an open loop, that is devised to be applied around the head of a user adapting to the current head shape and applying a substantially evenly distributed force against the head.

6. The carrier as recited in claim 1, wherein a part of the cable is devised to take on a spiral shape or a screw shape in the absence of a load.

7. The carrier as recited in claim 4, wherein the nose support is fastened to the holder via the forehead support.

8. The carrier as recited in claim 4, further comprising a back head support connected to the elongate member or cable to the holder or the housing said back head support preferably being devised to clasp around the back head of a user below or above the elongate member or cable when applied around the head of a user.

9. The carrier as recited in claim 4, further comprising a support frame having a front piece that via pivotable joints is connected to symmetrically placed side pieces, wherein the holder the forehead support and the nose support are fastened to the front piece of the support frame and wherein the side pieces each are provided with ear supports and fastening devices for detachable and adjustable fastening of the elongate member or cable, the elongate member or cable being devised to form an open loop between the fastening devices, the size of said loop being adjustable to the current head shape by adjusting the fastening of the elongate member or cable.

10. The carrier as recited in claim 4, wherein the forehead support is pivotably fastened to the holder or the support frame.

11. The carrier as recited in claim 4, wherein the elongate member or cable is provided with at least on flat head contact surface.

12. The carrier as recited in claim 4, further comprising a back head support arranged at the elongate member or cable between the fastening devices.

13. The carrier as recited in claim 4, further comprising a housing for an optical apparatus, said housing being integrated with the holder.

14. A carrier for supporting an optical apparatus intended to be positioned in front of the eye of a user, the carrier being provided with a housing, said carrier comprising:

- an elongate member, e.g. a cable, fastened to the housing;
- a fastening device mounted on the housing for detachably fastening a nose part of the elongate member; the elongate member being devised to form an open loop between the fastening points of the housing.

15. A head-mounted picture presentation system, comprising means for presenting a picture to the eye of a user, including a carrier according to claims 1, 4 or 14.

16. A head-mounted gaze control apparatus, comprising means for detecting the gaze direction of an eye, including a carrier according to claims 1, 4 or 14.

* * * * *